United States Patent [19]
Wilhelm

[11] 3,916,636
[45] Nov. 4, 1975

[54] METHOD OF AND APPARATUS FOR BURYING STIFF-WALLED PIPES IN THE GROUND

[76] Inventor: Friedrich Wilhelm, Kantstrasse 100, 28 Bremen, Germany

[22] Filed: July 15, 1974

[21] Appl. No.: 488,451

[30] Foreign Application Priority Data
July 17, 1973 Germany............................ 2336302

[52] U.S. Cl. ........................ 61/72.7; 61/42; 37/63; 254/29
[51] Int. Cl.² ............................................ F16L 1/00
[58] Field of Search ............ 61/72.7, 72.5, 42, 72.4; 254/29 R; 37/63

[56] References Cited
UNITED STATES PATENTS

| | | | |
|---|---|---|---|
| 2,229,248 | 1/1941 | Lamb et al. | 254/29 R |
| 2,274,431 | 2/1942 | Renner | 61/72.7 X |
| 2,325,565 | 7/1943 | Williams | 61/42 |
| 2,823,898 | 2/1958 | Bankston | 61/72.7 |
| 3,227,419 | 1/1966 | Lackey | 61/72.7 X |

*Primary Examiner*—Jacob Shapiro

[57] ABSTRACT

A method of and apparatus for burying a stiff-walled pipe in the ground, is disclosed, in which the individual pipe is forced forward from an access pit directly into the earth, while water flows through the interior of the pipe from the rearward end thereof, as seen in the direction of advancement, and emerges at the forward end of the pipe.

13 Claims, 2 Drawing Figures

METHOD OF AND APPARATUS FOR BURYING STIFF-WALLED PIPES IN THE GROUND

BACKGROUND OF THE INVENTION

The invention relates to a method of laying stiff-walled tubes in the earth and to an apparatus for practicing this method.

Stiff-walled pipes, especially public utility lines such as gas or water mains, are conventionally buried along roadways or the like by first digging a shallow ditch which is then backfilled after laying the pipeline consisting of a plurality of individual pipes.

Since the obstructions which are created by the excavation of the ditch, especially along built-up streets, frequently cannot be tolerated owing to the increasing traffic, it has long been the practice to drive underground supply lines, such as gas pipes or the like forward from an excavated access pit. The driving of the individual sections of pipe might have been performed by setting the pipe against the side of the access pit and then driving it forward into the earth by powerful hammer blows or the like. It was found, however, that sufficiently long pipe sections cannot be driven in this manner, due to the great friction to which the pipe is subjected while it is being driven. The only practical known method, therefore, consists in using long horizontal drills to create bores into the earth surrounding the excavated access pit, into which the individual pipes can be inserted. This method, however, has the disadvantage that only very short sections of pipe can be laid, owing to the limited length capacity of the available earth drills, and it is also to be noted that the noise created by the known drilling machines results in an intolerable burden upon residents living close to the worksite.

The invention is addressed to the problem of creating a method as well as an apparatus which will make it possible to install stiff-walled tubes, especially supply lines, underground at little expense, over substantially greater driving distances than has been possible hitherto.

This problem is solved by the invention by means of a method for laying stiff-walled pipes by driving them forward underground, in which the individual pipe is forced forward from an access pit directly into the earth, while water flows through the interior of the pipe from the rearward end thereof, as seen in the direction of advancement, and emerges at the forward end of the pipe.

The apparatus of the invention is characterized by a double-acting, hydraulically powered piston and cylinder unit whose rear end, as seen in the direction of advancement, can abut against the earth, especially against the rear wall of the pit; a pressure applying means provided at the forward end of the piston and cylinder unit, which is attached by means of a cable, chain or the like to a traction means which can be installed upon the rearward end of the pipe; and a system for feeding water into the interior of the pipe from the rearward end thereof.

A preferred embodiment of the invention is characterized by the fact that the piston and cylinder unit has two hydraulic jacks disposed in a horizontal plane parallel to one another and operated by water. A multiway valve may be provided to control the movement of the piston or pistons of the piston and cylinder unit.

Provision may also be made in accordance with the invention so that a portion of the water passing through the hydraulic jacks will be able to be introduced into the interior of the pipe by means of a flexible high-pressure water line connected to the rearward end of the pipe. The traction means may be in the form of a cap which can be placed over the rearward end of the pipe and which is provided with a hook for the chain or the like and with a connection for the hose or the like. A nozzle of reduced flow cross section may be installable on the forward end of the pipe.

It is furthermore desirable to provide a valve in the discharge line for the water passing through the hydraulic jack, to permit control of the water pressure exerted on the hose or the like.

In accordance with the invention, provision can also be made for making the piston and cylinder unit adjustable vertically and/or laterally in order thus to provide precise control of the direction in which the pipe is driven, and on the other hand to enable the position of the apparatus to be adapted to the pipe while the latter is being driven.

Preferably, the multiway valve is in the form of a valve body located between the hydraulic jacks but higher than the latter. The pressure applying means may be in the form of a yoke releasably surrounding the pipe lying between the hydraulic jacks and releasably joined to the pistons of the hydraulic jacks, and having affixed to its upper side a hook or the like to which the chain or the like may be attached.

BRIEF DESCRIPTION OF THE DRAWING

The invention is illustrated, by way of example, in the attached drawing in which.

DETAILED DESCRIPTION OF A PREFERRED EMBODIMENT

Figure 2:
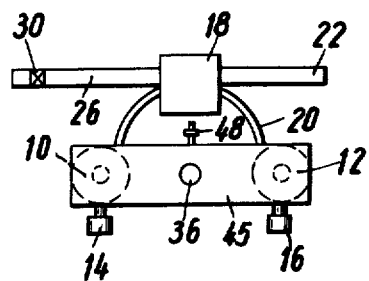
FIG. 2 is an elevational view taken from the left side of the apparatus illustrated in FIG. 1.

As the drawing shows, the apparatus of the invention comprises two double-acting hydraulic jacks 10, 12, which lie parallel to one another in a horizontal plane, and can be supported by means of vertically adjustable supports 14 and 16 on the floor of an access pit from which a pipe is to be driven. Between the hydraulic jacks 10 and 12, but at a higher level than the latter as shown in FIG. 2, there is a valve body 18 which communicates through the support legs 20 with the two hydraulic jacks 10 and 12. In the valve body 18 there is a multiway valve by means of which water entering under pressure through a feed line 22 coming from a hydrant, for example, or the like, can be delivered to one side or the other of the pistons of the double-acting hydraulic jacks 10 and 12. Discharged water is carried away from valve body 18 through an outlet line 26, and when a closed circulation system is used it is returned to the feed line 22 through a pump or the like. If water from hydrants, i.e., drinking water, is used, the water emerging from line 26 at 28 is discharged into the open. In line 26 there is provided a control valve 30 which makes it possible to deliver a desired amount of the discharge water flowing through line 26 to a cap 34 which is mounted on the rearward end of a pipe 36 which is to be driven in the direction of the arrow A. The water flowing through pipe 36 flows at the leading end through a constricted orifice 38 of a nozzle or the like 40, and serves as a lubricant in the driving of the pipe.

The pistons 42 and 44 of the hydraulic jacks 10 and 12 are joined to a yoke 45 of bipartite construction which, as seen in FIG. 2, releasably surrounds the pipe 36 being driven, the connection of the yoke to the pistons 42 and 44 being also releasable. On the upper side of yoke 45 there is mounted a hook 48 from which a chain 50 runs to a hook 52 on cap 34.

Figure 1:
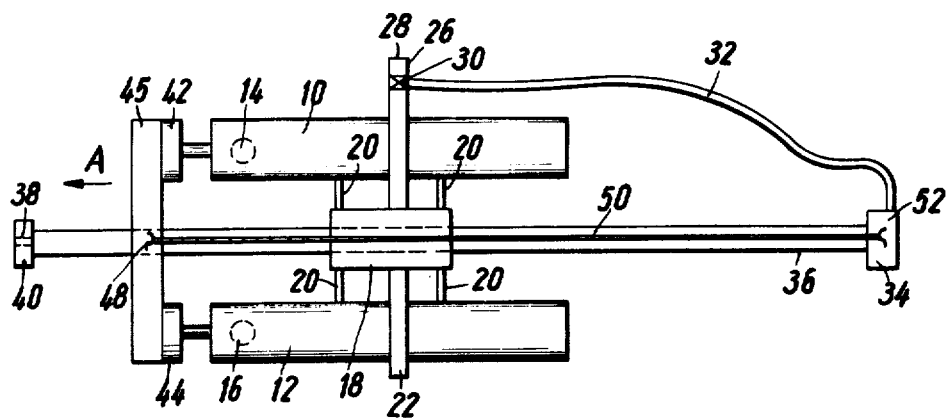
FIG. 1 is a top plan view of an embodiment of the apparatus of the invention.

The apparatus of the invention operates in the following manner:

First the pipe 36 is placed in the position shown in FIG. 1 against the wall of an excavated pit or the like, the nozzle 40 engaging the earth wall. The rearward end of the apparatus, which is defined by the rearward end of the hydraulic jacks 10 and 12, is firmly abutted against the earth at the rear wall of the pit or in some other manner. The yoke 45, which has been placed on the pipe, surrounding the latter, is joined to the pistons 42 and 44, by means of linchpins for example. Then the chain 50 fastened to hook 48 is drawn tight and attached to hook 52 on cap 34 which has previously been installed on the rearward end of the pipe. Now the multiway valve in valve body 20 is adjusted such that water under pressure is delivered to the rearward side of the pistons 42 and 44 whose plungers are substantially in their retracted position in FIG. 1. Pistons 42 and 44 are driven forward, thereby moving the yoke 45 which surrounds pipe 36 with clearance, leftward to thereby move pipe 36 leftward into the earth by means of chain 50 and hook 52 and cap 34. The water flowing out of the hydraulic jacks 10 and 12, and which has been delivered through line 22, flows through valve body 20 into line 26, a portion of this water being delivered at valve 30, under a certain pressure, to the interior of the pipe, so that this water emerges at 38 and acts as a lubricant. The setting of valve 30 is important to the operation of the apparatus: if the outlet 28 were entirely shut off-- that is, if all of the water flowing from the hydraulic jacks were delivered into hose 32, a back pressure would build up which would prevent any further advancement of yoke 45 and hence of pipe 36. On the other hand, it is important for lubricant to reach the nozzle 40 through hose 32, in order thus to facilitate the advancement of the pipe. Depending on the soil conditions, the setting of valve 30 can easily be adjusted by an operator. If an obstruction is to be washed away, the entire water pressure can be delivered to hose 32, and the obstruction can then easily be flushed away without further advancement of the pipe, unless a cable or the like is involved.

As soon as the piston and cylinder unit has delivered its maximum stroke, that is, when pipe 36 has been pushed leftward in FIG. 1 as far as possible, the chain 50 is simply removed from hook 52, the pistons 42 and 44 are retracted again by operating the multiway valve 20, the chain is drawn taut again and hooked at 52, whereupon another advancement of the pipe can be performed.

The apparatus of the invention makes it possible in a surprisingly simple manner to drive stiff-walled pipelines forward through the earth, especially public utility pipes, and if two hydraulic jacks are used, having a cross section of, for example, 15 cm, and if drinking water at a pressure of about 5 atmospheres gauge taken from a hydrant is used, pipes two inches in diameter having a length of about 10 meters can be driven forward effortlessly. The apparatus of the invention is extremely economical to manufacture on account of its simple construction, and it is environmentally acceptable in operation since it causes virtually no noise. As stated previously, drinking water available from the hydrant or the like may be used as the operating fluid both for the operation of the hydraulic jacks and for passage through the interior of the pipe. On the other hand, it is also possible to use a pump for driving the hydraulic jacks and for the flushing of the interior of the pipe. Since a recirculating system can also be used with low losses, the apparatus may also be used in locations where no suitable source of water is available.

The surprising teaching of the invention is based on using as a hydraulic tool the very pipe that is being laid and driven, since the water emerging at the leading end of the pipe through the nozzle of reduced flow cross section produces a lubricating action between the leading end of the pipe and the surrounding earth, so that even under difficult soil conditions, long pipes of great cross section can be laid with the application of relatively little power. Since water alone is used for the operation, contamination of the soil by other kinds of drilling fluids need not be feared.

Another advantage of the invention is that damage to underground cables or the like, which is a danger involved in the use of earth drills and which may expose the operators of the earth drill to electric shock, can be virtually excluded. For if the leading end of the pipe collides with a cable or the like while it is being driven, the nozzle will become blocked so that the water flowing through the pipe will be stopped. Accordingly, the pressure within the pipe will increase, and finally such a high back pressure will build up through the hose or flexible water line and the multiway valve in the piston and cylinder unit that the pipe will no longer be driven forward. The operator will then attempt to eliminate the unsuspected obstruction by operating the control valve provided in accordance with the invention in the hydraulic water discharge line, in order to cause a greater amount of water to flow into the pipe. If, however, he does not succeed with this increased pressure in flushing the obstruction away, as he might in the case of small stones, for example, or the like, he will immediately recognize that a cable or the like is involved, so that damage thereto can reliably be prevented.

While a preferred embodiment of the invention has been described above, it is to be understood that the invention is not limited thereto, but comprises any modifications within the scope of the appended claims.

I claim:

1. An apparatus for burying a stiffwalled pipe in the ground, comprising: fluid-operable means for engagement with the pipe and adapted to propel the latter in a substantially horizontal direction, means for introducing liquid into the pipe for discharge from said pipe at the front end thereof, when looking in said direction, conduit means connected to said fluid-operable means for introducing water thereinto, and means interconnecting said conduit means with said means for introducing liquid into said pipe, for introducing at least a portion of the water passing through said fluid-operable means into said pipe.

2. An apparatus according to claim 1, comprising pressing means connected to said fluid-operable means, a pulling device to be connected to said pipe adjacent the rear end thereof when looking in said direction, and means interconnecting said pressing means and said last-mentioned means, whereby when said fluid operable means is actuated it propels said pressing means and thereby said pipe in said direction.

3. An apparatus according to claim 2, wherein said fluid-operable means comprises two cylinder-piston units arranged substantially parallel to each other in a substantially horizontal plane, and conduit means leading into said cylinder-piston units for introducing water thereinto to actuate the same.

4. An apparatus according to claim 1, comprising a multi-way valve for controlling said fluid-operable means.

5. An apparatus according to claim 3, comprising a multi-way valve in said conduit means for controlling the movement of said cylinder-piston units.

6. An apparatus according to claim 1, wherein said means interconnecting said fluid-operated means with said means for introducing liquid into said pipe, includes a flexible hose.

7. An apparatus according to claim 2, wherein said pulling device comprises a cap to be placed upon said rear end of said pipe, hook means on said cap for connecting said member thereto, and a connection for said flexible hose.

8. An apparatus according to claim 1 which comprises a nozzle adapted to be placed on the front end of the pipe.

9. An apparatus according to claim 1, which comprises a discharge conduit connected to said fluid-operable means, a valve in said discharge conduit, said means for introducing liquid into said pipe being controlled by said valve.

10. An apparatus according to claim 1, comprising means for adjusting the height of said fluid-operable means with respect to the ground.

11. An apparatus according to claim 1, which comprises means for adjusting the position of said fluid-operable means in a horizontal plane.

12. An apparatus according to claim 4 wherein said multi-way valve comprises a valve body located between but higher than said cylinder piston units.

13. An apparatus according to claim 3, wherein said pressing means comprises a yoke surrounding the pipe between said cylinder-piston units and being detachably connected to said cylinder-piston units, hook means connected to said yoke, said member being adapted to be connected to said hook means.

* * * * *